United States Patent
Jordan

[15] 3,686,702
[45] Aug. 29, 1972

[54] OIL STICK WIPERS

[72] Inventor: Robert L. Jordan, 1005 Sunset Lane, Bethlehem, Pa. 18017

[22] Filed: Sept. 16, 1970

[21] Appl. No.: 72,748

[52] U.S. Cl. ............................... 15/210 B, 33/126.7 R
[51] Int. Cl. .......................... G01f 15/12, G01f 23/04
[58] Field of Search .. 15/210 B; 33/126.7 R, 126.7 A; 277/203; 101/425

[56] References Cited

UNITED STATES PATENTS

| | | | |
|---|---|---|---|
| 1,992,423 | 2/1935 | Hale | ..........................15/210 B |
| 2,439,171 | 4/1948 | Kreider | ....................15/210 B |

*Primary Examiner*—Leon G. Machlin
*Attorney*—Borst and Borst

[57] ABSTRACT

A device attachable to fender of any place desirable by user under the hood of any car, truck or any type transmission or like machinery which uses a dipstick device for the purpose of wiping the fluid off said dipstick preceding the actual reading of the fluid level. A device comprising a disposable or permanent wiper, a material of absorbent or nonabsorbent nature such as felt of glass fiber, the wipers being manually urged toward each other so to wipe said dipstick slideable there between. A well is provided on either end of wiper for the purpose of catching and absorbing fluid thus eliminating the pell mell that exist each time the fluid level must be checked.

2 Claims, 3 Drawing Figures

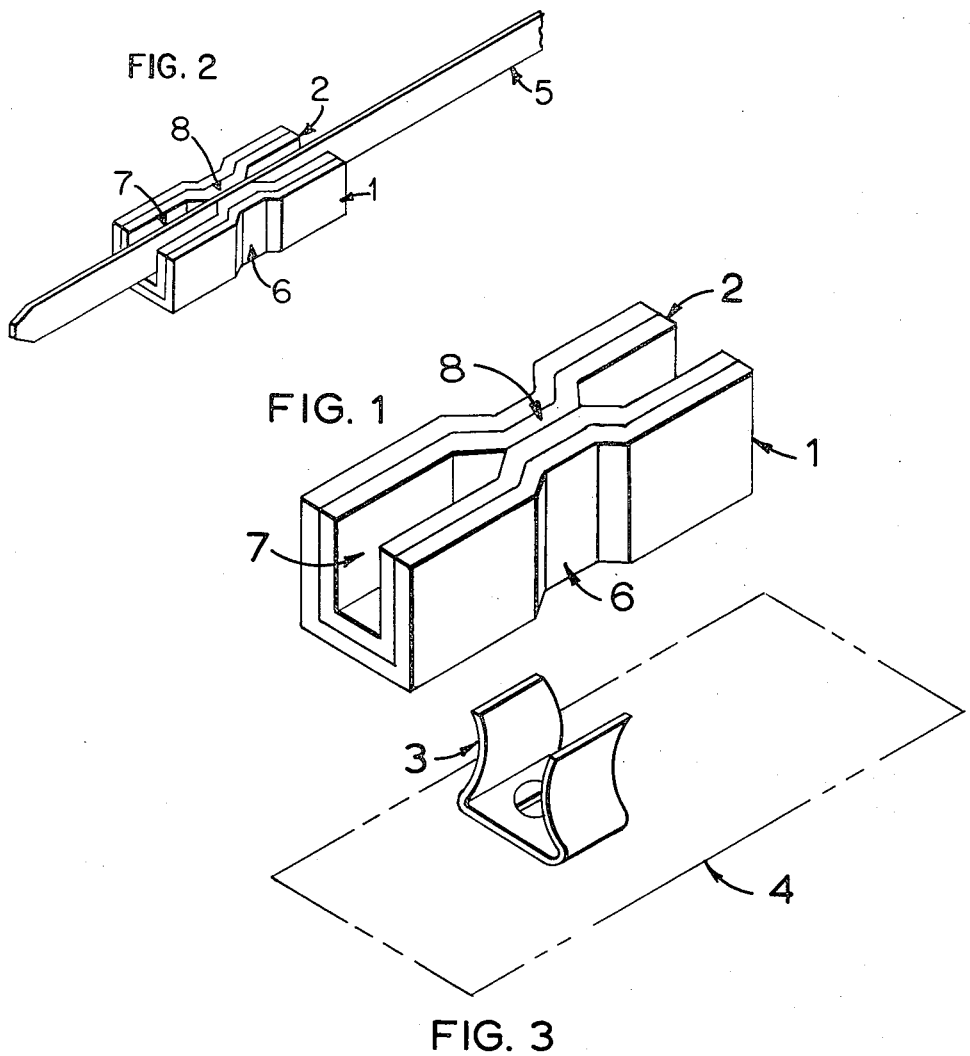

OIL STICK WIPERS

THE OBJECT OF INVENTION

My invention relates to a device attachable to and removable from under hood of any car, truck or any suitable spot near fluid dipstick for the purpose of wiping fluid from dipstick preceding actual reading of oil level.

An object of my invention is to provide a convenient and effective fluid stick wiper, which is of simple construction, manufactured inexpensively, small enough not to take up needed room yet large enough to effectively wipe said fluid stick clean.

Still another object of my invention is to provide a permanent or disposable, solid or cartridge type wiper of nonabsorbent or absorbent material.

Other objects and advantages of this invention will become apparent from a consideration of accompanying drawings wherein for purposes of illustration only a specific form of the invention is set forth in detail.

IN THE DRAWINGS:

FIG. 1 is a perspective view of wiper.

FIG. 2 is also a perspective view of wiper invention but in its operative position.

FIG. 3 is a perspective view of a spring clip permanently mounted to the chassis section of an automobile.

Referring more particularly to the drawings, my fluid stick wiper comprises a cartridge casing as shown in 1 of FIG. 1 of preferably flexible resilient, heat resistent material such as formed by plastic resins to which polyimide could be applied for a heat resisting color coating, inside and completely covering internal surface of cartridge casing 1 is wiper material 2 which can be of absorbent such as felt which would be disposable and easily replaced or said wiper material can be of nonabsorbent nature such as neoprene would be permanent, can be cleaned when it becomes soiled, wiper section 8 as shown in FIG. 2 has a convex configuration for the purpose of a better fit as fluid stick 5 is drawn through wiper section 8 indented section 6 prevents wiper from slipping while being held during wiping of fluid stick or when stored in clip 3 which is attached to any convenient chassis section 4, a well 7 is provided at either end of wiper FIG. 2 for the purpose of catching and absorbing excess fluid as it is pushed off said fluid stick 5.

While I have shown and described what I regard to be the preferred embodiment of my invention, please note that various changes, modification and rearrangements may be made therein without deporting form the scope of my invention.

I now claim:

1. A dipstick wiper device comprising a casing having a pair of opposing side walls and a connecting bottom wall, said side walls being oppositely indented, a wiping material disposed on the inside portion of the indented side walls, the indented portion of said side walls being located intermediate the ends thereof whereby a well for collecting wiped fluid is provided at each end of said device.

2. A dipstick wiper device as defined in claim 1, wherein there is provided a spring clip adapted to be permanently mounted in said device, said device being removably mounted at said indented side wall section in said clip.

* * * * *